United States Patent

[11] 3,591,717

[72] Inventors Thomas R. Kawall
Cicero;
Lance C. Lawson, Glenwood, both of, Ill.
[21] Appl. No. 866,551
[22] Filed Oct. 15, 1969
[45] Patented July 6, 1971
[73] Assignee Stewart-Warner Corporation
Chicago, Ill.

[54] FACSIMILE ADJUSTMENT FIXTURE
10 Claims, 10 Drawing Figs.

[52] U.S. Cl. .......... 178/7.6, 346/139 A
[51] Int. Cl. .......... H04n 1/14, H04n 1/24
[50] Field of Search .......... 178/7.6; 355/8, 12, 68, 71; 346/139 A

[56] References Cited
UNITED STATES PATENTS
2,712,611 7/1955 Nyman .......... 178/7.6 UX

*Primary Examiner*—Robert L. Griffin
*Assistant Examiner*—Richard K. Eckert, Jr.
*Attorneys*—Augustus G. Douvas, William J. Newman and Norton Lesser

ABSTRACT: A fixture having an adjustable light source unit for aligning the optical scanners of a facsimile scanner assembly, and having a revolvable stud member with a longitudinal flat and a lengthwise metal shim relative to which the printer contact means of the scanner assembly may be adjusted.

PATENTED JUL 6 1971

3,591,717

Inventors:
Thomas R. Kawall,
Lance C. Lawson,

By

Atty

FACSIMILE ADJUSTMENT FIXTURE

BACKGROUND OF THE INVENTION

The present invention pertains generally to the field of facsimile apparatus used in wire transmission of graphic data, and more particularly to a fixture for adjusting and aligning the optical scanners and printer contact means of optical scanner assemblies used in such apparatus.

In a typical optical facsimile system, elemental areas of copy material are successively scanned in a transmitter, and images from the scanned material are converted by an optical system into electrical signals for transmission to a receiver. At the receiver, electrical signals from the transmitter are converted to printing current and passed through associated printer contact means and a linear printer bar to produce on intervening moist electrolytic recording paper an image of the transmitted copy.

One type of facsimile apparatus adapted for use as a transmitter or receiver embodies an optical scanner assembly comprised of drive and idler pulley assemblies, a timing belt assembly trained about the pulley assemblies, and three combined optical scanner and printer contact units, each including an optical scanner and printer contact means, mounted on the timing belt assembly for movement therewith in a continuous closed path. In the transmission mode of operation, the optical scanners are moved successively across copy material to be scanned, while in the receiving mode, the printer contact means are moved successively across recording paper lengthwise of the printer bar.

For accurate resolution of copy material during scanning and reproduction the optical scanners should be aligned in corresponding horizontal and vertical planes on the optimum optical center, and the printer contact means likewise should be in proper alignment for accurate cooperation with the printer bar. Some difficulties have been experienced on the production line in adjusting and aligning the optical scanners and printer contact means before the optical scanner assembly is initially mounted within the transceiver as a whole. Still greater difficulties have been experienced in the field in effecting adjustments of the assembly when realignment of the optical scanners and printer contact means is required. Heretofore, it has usually been necessary to return the optical scanner assembly to the manufacturer for the required adjustments and realignment.

SUMMARY OF THE INVENTION

The present invention is concerned with a fixture which may be used, either on the production line or in the field, for aligning and adjusting optical scanner assemblies of the general type described above.

The fixture includes a base for supporting the optical scanner assembly, and a standard at one side of the base adjacent to which the combined optical scanner and printer contact units may be individually and successively indexed. A horizontal disposed light source unit is carried by the standard and is vertically and horizontally adjustable in conjunction with adjustment of the diaphragm apertures of the optical scanners whereby to effect alignment between the light source unit and the optical scanners on the optimum optical center for maximum output of the scanners. Additionally, a horizontally disposed stud member is revolvably mounted in the standard. The stud member has a longitudinal flat, and a metal shim mounted lengthwise therein with an exposed edge, relative to which the contact elements of the printer contact means may be adjusted.

During adjustments, the optical scanners and printer contact means are connected to a meter and associated circuitry, whereby optimum points of adjustment are identified by indications on the meter of maximum current flow.

DESCRIPTION OF THE PREFERRED EMBODIMENT

Figure 1:
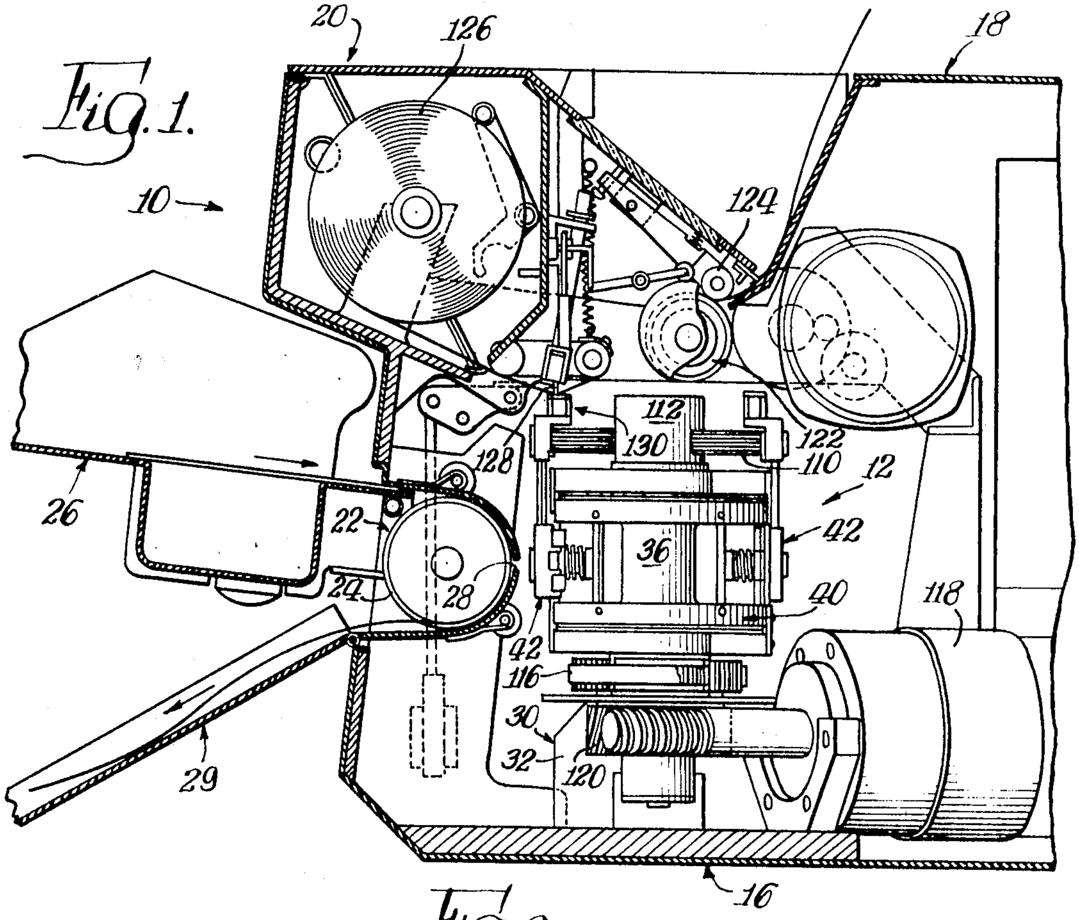
FIG. 1 is a view, partly in section and partly in elevation, of the front portion of a facsimile transceiver incorporating an optical scanner assembly of the type with which the fixture of the present invention is adapted to be used for adjustment and alignment thereof.

Referring now to FIG. 1, there is shown a facsimile transceiver 10 incorporating an optical scanner assembly 12 with which the adjustment fixture 14 (FIGS. 2—5) of the present invention is adapted to be used. The facsimile transceiver 10 (FIG. 1) comprises a main frame 16 enclosed by a cover assembly 18 and a top door assembly 20.

Operable in the transmission mode of the facsimile transceiver 10 are a copy feed mechanism 22 and the scanner assembly 12. The copy feed mechanism 22 includes a transverse power driven copy feed roller 24 which draws copy material from a copy feed tray 26, feeds the copy material past a longitudinal scanning slot 28, and discharges the same onto a tray 29. The scanner assembly 12 extends parallel to the copy feed roller 24, and, as shown in FIGS. 1 and 2, includes frame means 30 comprised of a main frame 32 and a yoke member 34, drive and idler pulley assemblies 36 and 38, a timing belt assembly 40 trained about the pulley assemblies 36 and 38, combined optical scanner and printer contact units 42 carried by the timing belt assembly 40, and associated synchronizing and electrical transmission means.

Figures 2, 9:
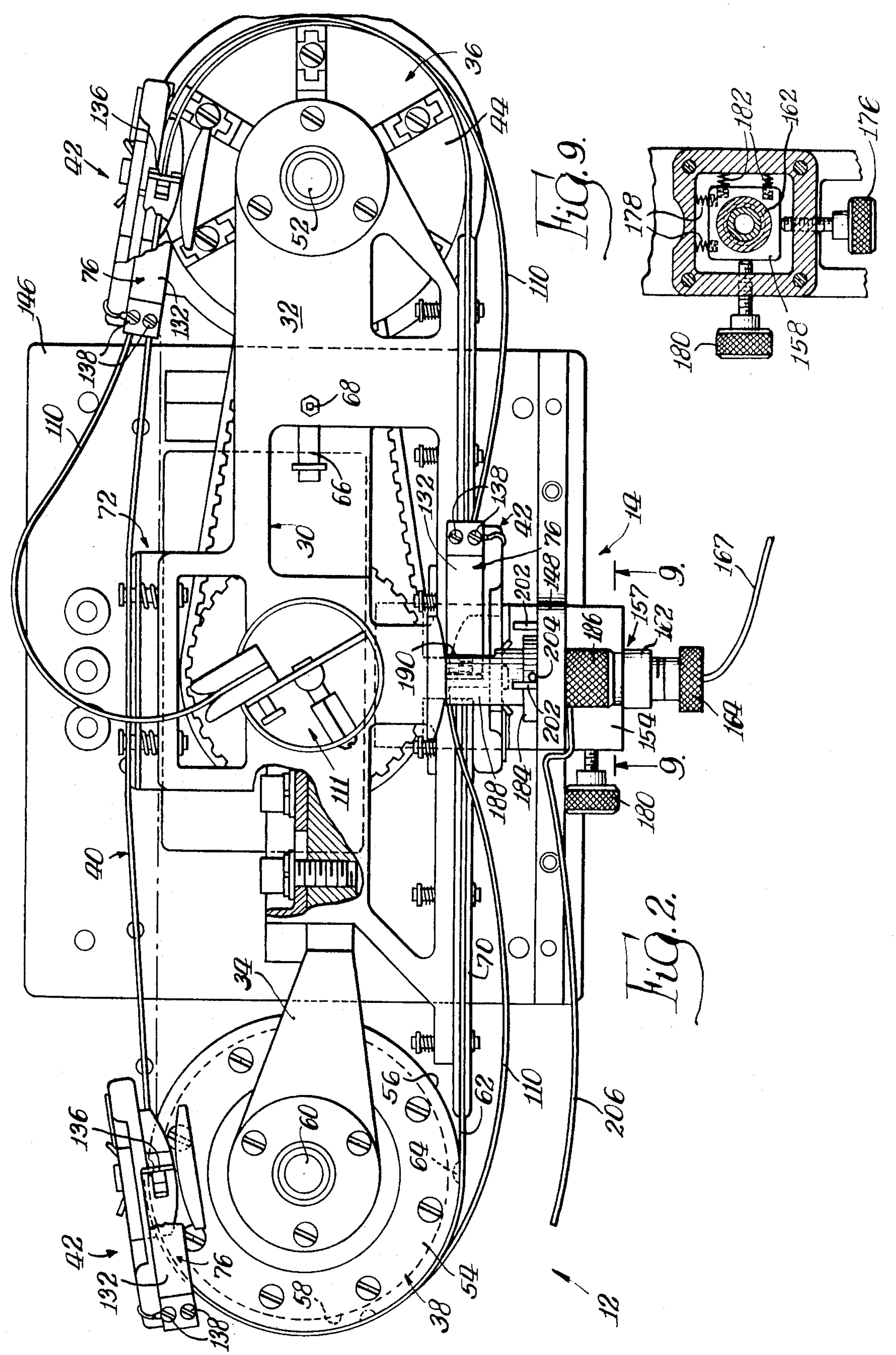
FIG. 2 is a plan view, on an enlarged scale and with certain portions broken away, of the optical scanner assembly of the facsimile transceiver of FIG. 1, positioned on the facsimile adjustment fixture of the present invention.
FIG. 9 is a sectional view of the adjustment means for the light source unit of the adjustment fixture, taken substantially along the line 9–9 in FIG. 2, looking in the direction indicated by the arrows.
Figures 3, 4:
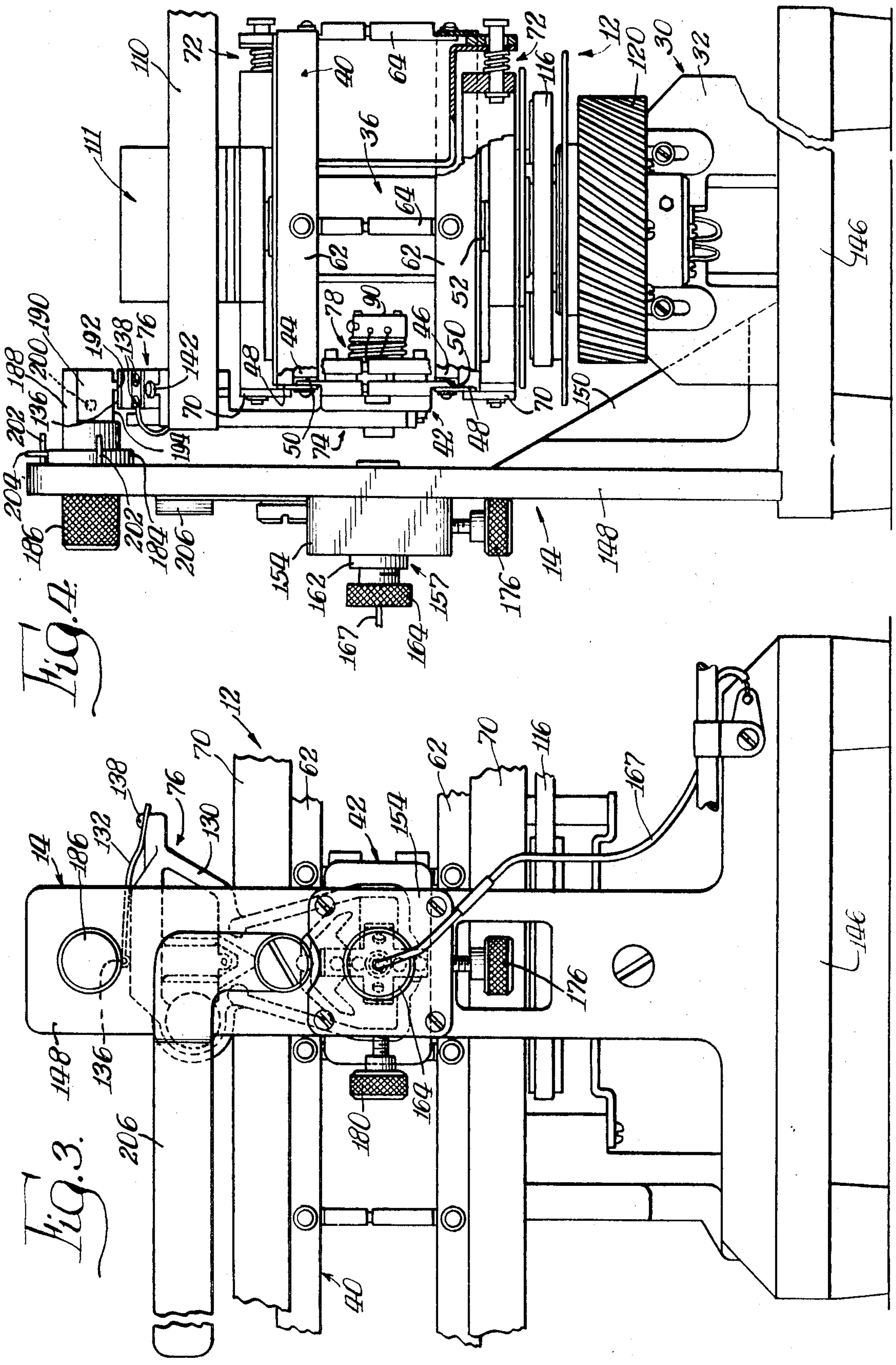
FIG. 3 is an elevational view of the front of the fixture of FIG. 2, and of a portion of one side of the optical scanner assembly positioned thereon.
FIG. 4 is a side elevational view of the fixture of FIG. 2, and of one end of the optical scanner assembly positioned thereon.

As shown in FIGS. 2 and 4, the drive pulley assembly 36 comprises a spoollike drive pulley having upper and lower flange portions 44 and 46 which present axially spaced cylindrical faces 48 and a plurality of circumferentially spaced tooth recesses 50. The drive pulley assembly 36 is secured to a vertical drive shaft 52 which is journaled in bearing assemblies mounted in the main frame 32. The idler pulley assembly 38 comprises a spoollike idler pulley having upper and lower flange portions 54 which each present an outer cylindrical face 56 and an inner recessed cylindrical surface 58. The outer cylindrical faces 56 and the inner cylindrical surfaces 58 of the idler pulley assembly 38 are horizontally aligned respectively with the cylindrical faces 48 and the tooth recesses 50 of the drive pulley assembly 36. The idler pulley assembly 38 is secured to a vertical idler shaft 60 journaled in bearing assemblies mounted in the yoke member 34.

Trained about the drive and idler pulley assemblies 36 and 38, as previously noted, is the timing belt assembly 40. As shown in FIGS. 2—5, the timing belt assembly 40 comprises a pair of spaced apart horizontal endless flexible steel tapes 62 of narrow width interconnected by a plurality of equidistantly spaced parallel pinmembers 64. The tapes 62 are engageable with the cylindrical drive and idler pulley faces 48 and 56, while the end portions of the pin members 64, which serve as tooth elements, have meshing engagement with the drive pulley tooth recesses 50 whereby a positive driving connection is established between the drive pulley assembly and the timing belt assembly. During movement of the timing belt assembly 40 about the idler pulley assembly 38, the inner recessed cylindrical surfaces 58 serve to accommodate the end portions of the pin members 64. To facilitate adjustment of the scanner assembly in a manner to be described hereinafter, a manually operated index pin 66 (FIG. 2) is slidably mounted in the main frame 32 and is movable into and out of engagement with one of the tooth recesses 50 of the drive pulley assembly 36. A set screw 68 is provided for securing the index pin 66 in any desired axial position.

To maintain the timing belt assembly 40 in a straight line path for accurate resolution of copy during scanning thereof, a pair of laterally inwardly spring biased longitudinal flat strips 70 (FIGS. 2 and 4), which overlie and engage portions of the outer edges of the tapes 62, are suitably mounted on the scanning side of the main frame 32 for maintaining the tapes 64 flat against adjacent guide strips or surfaces. Also, biasing means, indicated generally at 72, is arranged on the side of the main frame 32, opposite the tape guide strips 70, for imposing a lateral force on the timing belt assembly whereby to maintain the latter under a slight tension for precision operation of the scanner assembly.

Supported by and moved with the timing belt assembly 40 are the combined scanner and printer contact units 42, three of which are incorporated in the specific scanner assembly herein disclosed. Each scanner and printer contact unit 42 includes a lower optical scanner carriage assembly 74 mounted on two of the pin members 64, and an upwardly extending carriage and contact assembly 76.

Figure 5:
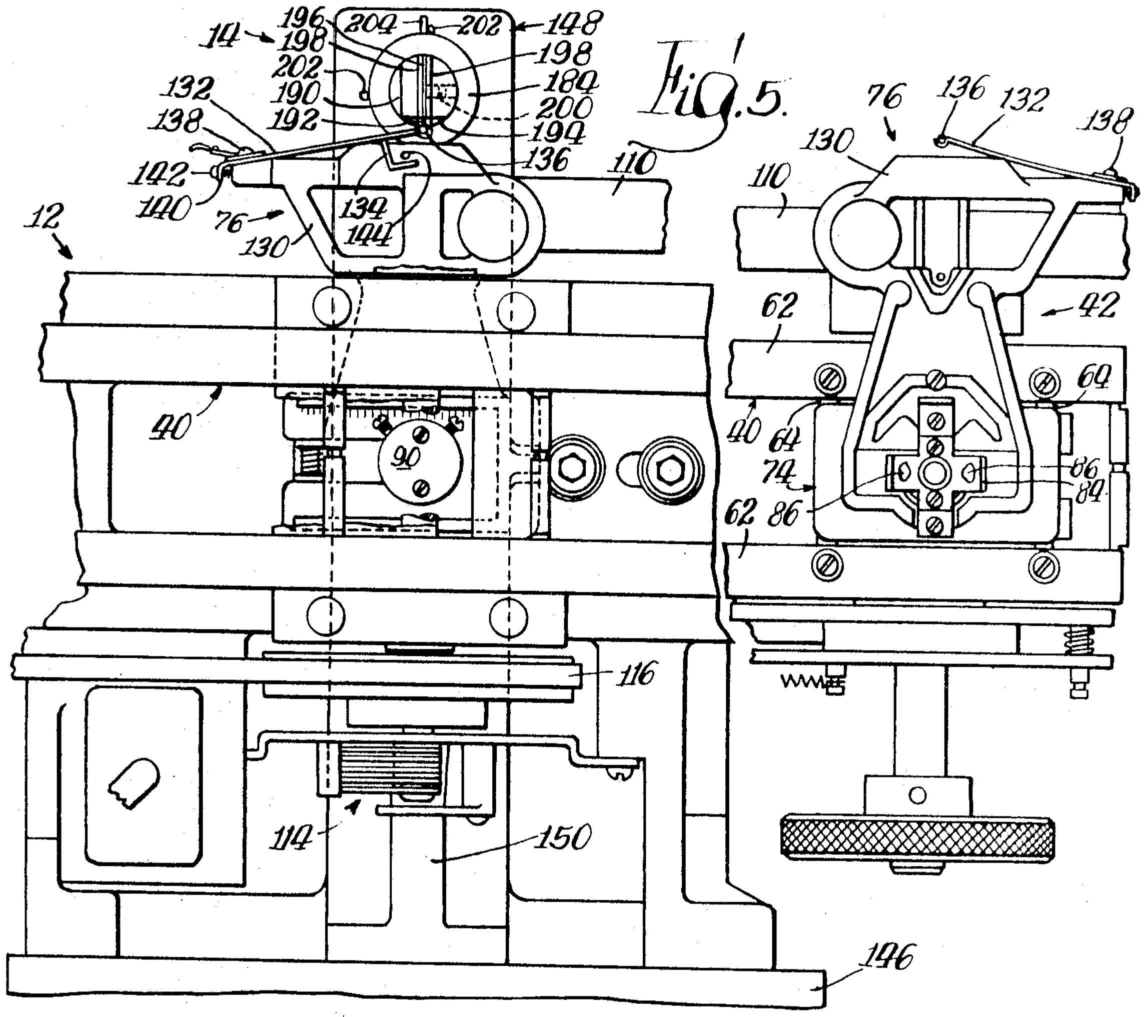
FIG. 5 is an elevational view of the back of the fixture of FIG. 2, and of portions of the other side of the optical scanner assembly positioned thereon.
Figure 6:
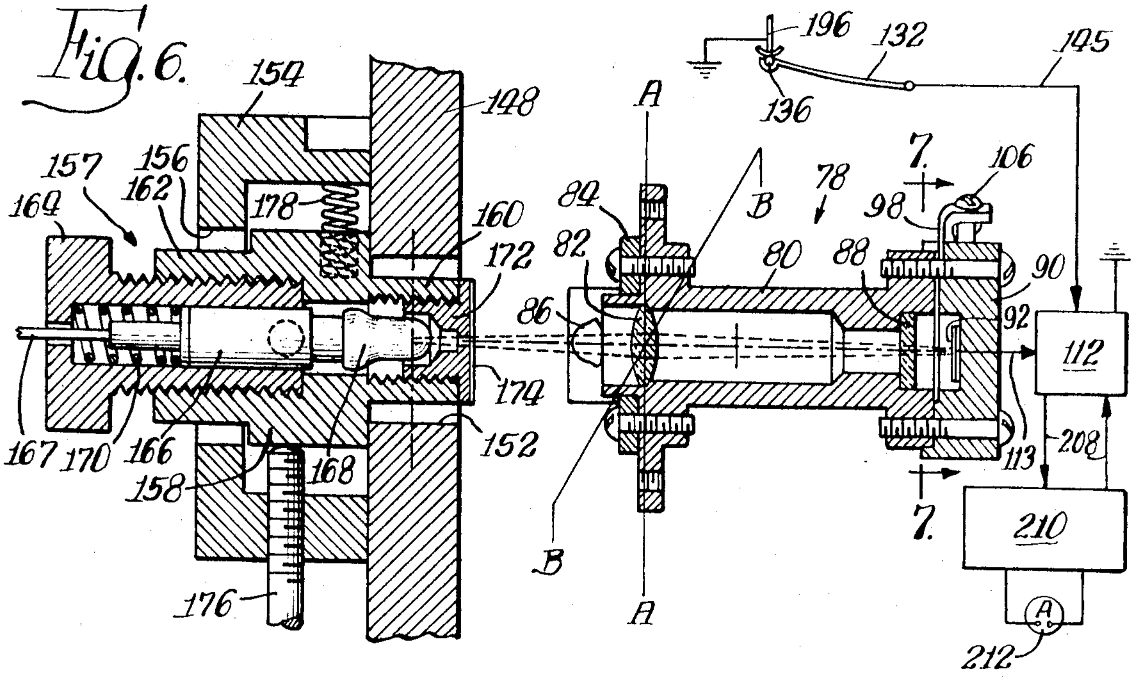
FIG. 6 is an enlarged sectional view of a portion of the fixture of the present invention adjacent the light source unit thereof, and of an optical scanner indexed at the light source unit, with associated electrical components and circuitry being shown schematically.

As best shown in FIGS. 4, 5 and 6, the scanner carriage assembly 74 carries an optical scanner 78 comprised of an elongated hollow lens holder 80. Mounted in the forward end of the lens holder 80 is a double convex lens 82, and secured to the front end of the lens holder 80 is a lamp holder 84 which is formed with apertures through which the forward ends of lamp bulbs 86 project for providing a scanning light source means. Mounted in the rearward end of the lens holder 80 is a conventional filter glass 88.

Figure 8:
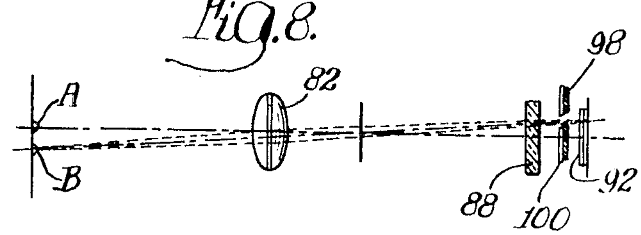
FIG. 8 is a diagrammatical view illustrating the effect of adjustment of the optical diaphragm means of the optical scanner of FIG. 6.
Figure 7:
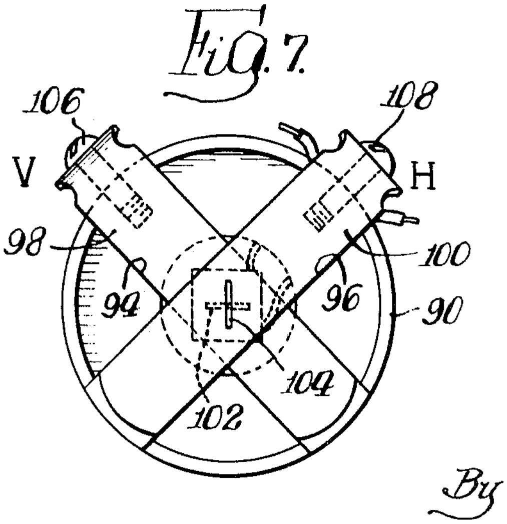
FIG. 7 is a front elevational view, on a further enlarged scale, of the optical diaphragm means of the optical scanner of FIG. 6, taken substantially along the plane 7–7 in FIG. 6, looking in the direction indicated by the arrows.

Secured to the rear annular flange of the lens holder 80 is a photocell holder 90. The holder 90 is formed with a central cavity in which a photocell 92 is mounted, and is also formed (FIG. 7) with perpendicular radial channels 94 and 96 in which generally rectangular diaphragm leaves 98 and 100 are adjacently positioned transversely of the lens holder 80 forwardly of the photocell 92. The diaphragm leaves 98 and 100, which constitute diaphragm means, are rectilinearly movable each in a path perpendicular to the other in their respective transverse planes, and are respectively provided with overlapping slots 102 and 104 which are arranged at an angle of 45° relative to the paths of movement of the diaphragm leaves and perpendicular to each other. The slots 102 and 104 define a square through which, as shown in FIG. 8, an image of an object area A (an elemental area of copy material) is projected to the photocell The upper ends of the diaphragm leaves 98 and 100 are formed with axial flanges through which are disposed adjustment screws 106 and 108. By threading the screws 106 and 108 inwardly or outwardly, the diaphragm leaves 98 and 100 may be adjusted rectilinearly for varying the relative positions of the slots 102 and 104 and hence the position of the square aperture relative to the horizontal centerline of the lens holder 80. Adjustment of the screw 106 effects movement of the square aperture in a vertical direction whereby, for example, the image of an object area B (FIG. 8), rather than of object area A, may be projected to the photocell 92. In a corresponding manner, adjustment of the screw 108 effects movement of the square aperture in a horizontal direction.

The combined scanner and printer contact units 42 are adapted to be connected to other electrical components of the transceiver 10 by means of a ribbon tape 110 and a rotor assembly 111 (FIG. 2) which includes a preamplifier unit 112 (shown schematically in FIG. 6). The photocells 92 are electrically connected with the preamplifier 112 by lines 113, one of which is shown in FIG. 6. The rotor assembly 111 also includes a commutator assembly 114 (FIG. 5) and is adapted to be driven from the drive pulley assembly 36 by means of a belt 116. A motor 118 (FIG. 1) is arranged to drive a gear 120 at the lower end of the drive pulley assembly 36.

When the gear 120 is rotated, the drive pulley assembly 36 and the timing belt assembly 40 are correspondingly rotated, and the units 42 with the optical scanners 78 are accordingly moved in a continuous closed path a portion of which extends parallel to the copy feed roller 24. As copy material is drawn about the copy feed roller 24, it is scanned, line-by-line, an elemental area at a time. The images received by the optical scanners 78 from the copy material are converted to electrical signals by suitable circuitry, and these signals are sent to another transceiver or other suitable facsimile recording device for reproduction of the original copy material.

In the receiving mode of the facsimile transceiver 10, electrical signals received from another transmitter are converted to printing current by suitable circuitry, and this current is used to produce an image of the transmitted copy on electrolytic recording paper. As shown in FIG. 1, the printout mechanism comprises a transverse power driven combined drive and heat roller assembly 122 and an associated pressure roller 124 which together serve to withdraw moist electrolytic recording paper from a roll 126, move the paper beneath a transverse linear printer bar 128, and issue the paper with reproduced data for viewing. Arranged for cooperation with the printer bar 128 are the carriage and contact assemblies 76.

Each carriage and contact assembly 76, as shown in FIGS. 2 and 5, includes a carriage block 130 and elongated strip means in the form of an elongated strip or leaf spring member 132. At one end of the strip 132 a depending generally L-shaped leg portion 134 is struck therefrom, and secured transversely across the same end is a contact element 136 in the form of a cylindrical pin member. The other end of the printer contact strip 132 is secured to an inclined top surface of the carriage block 130 by means of screws 138 projecting through apertures and into the block 130. Also, the printer contact strip 132 is formed with a depending arm portion 140, and extending therethrough is an adjustment screw 142 which is threaded into the adjacent wall portion of the carriage block 130. The free end of the contact strip 132 is self-biased upwardly, and the leg portion 134 is engageable with a lateral limit pin 144 carried by the block 130. The contact strips 132 are electrically connected with the preamplifier 112 by lines 145, one of which is shown in FIG. 6.

The printer bar 128 (FIG. 1) is disposed vertically above and in the straight line path of travel of the scanner and printer contact units 42 along one side of the scanner assembly 12. In the receiving mode, the printer bar 128 is biased downwardly and presses the paper from roll 126 downwardly into contact with the printer contact element 136 of the adjacent printer contact unit 42. As the timing belt assembly 40 is rotated, the printer contact units 42 are moved in the aforementioned continuous closed path and the printer contact elements 136 are successively moved lengthwise of the printer bar 128. Printing current is passed through the associated printer contact elements 136, the recording paper, and the printer bar 128, and iron from the printer bar 128 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 122, it is dried and the electrolytic printing process is completed.

For accurate scanning and reproduction of copy material, the optical scanners 78 of the scanner assembly 12 must be in proper alignment and the printer contact elements 136 likewise must be in proper alignment. In this connection the aforementioned adjustment fixture 14 of the present invention serves as a convenient means to accommodate alignment of the optical scanners 78 and of the printer contact elements 136.

As shown in FIGS. 2—5, the adjustment fixture 14 comprises a base 146, a standard or inverted T-shaped plate 148, and a brace 150. The standard 148 is provided intermediate of its ends with an aperture 152 (FIG. 6). Suitably secured to the standard 148 is a generally rectangular hollow casing 154 in the front wall of which is provided an aperture 156 that is axially aligned with the aperture 152 of the standard 148. Associated with the casing 154 is a radially slidable light source unit 157 which includes a sleeve 158 having an inner end 160 projecting through the aperture 152 and an outer end 162 projecting through the aperture 156. Threaded into the outer sleeve end 162 is a lamp holder 164 in which is mounted a lamp socket 166 with a lead line 167 for connection to the power supply, an associated light source or lamp bulb 168 and a socket positioning spring 170. Threaded in the inner sleeve end 160 is a diaphragm member 172 which carries a colamator 174 that serves as a polarizer to eliminate filament shadow from the lamp bulb 168. The light source unit 157 is adjustably mounted with in the casing 154, as best shown in FIG. 6 and 9, by means of a vertical adjustment screw 176 and opposed vertical springs 178, and a horizontal adjustment screw 180 and opposed horizontal springs 182.

Figure 10:
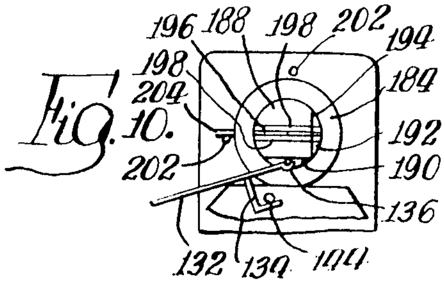
FIG. 10 is a partial elevational view of the upper end of the adjustment fixture with printer contact means in location for adjustment.

Revolvably mounted in the standard 148 adjacent the upper end thereof, as shown in FIG. 4, 5 and 10, is a rotary stud member 184 having a knurled outer end 186 and an inner end 188 with a first longitudinal flat 190 and with a node portion 192 projecting radially from a second longitudinal flat 194 normal to the flat 190. A metal shim 196 (0.001 inch thick) is mounted lengthwise in the inner end 188 of the rotary stud member 184 on the axis of the latter parallel to the first longitudinal flat 90. One edge of the shim 196 is exposed at the outer end of the nose portion 192. The shim 196 is insulated from the stud member 184 by an intervening layer of insulation material 198, and is grounded to the fixture 14 by a screw 200.

The stud member 184 is adapted to be rotated between a first position (FIG. 10) with the first longitudinal flat 190 disposed horizontally and a second position (FIGS. 4 and 5) with the nose portion 192 projecting downwardly. Secured in the standard 148 are a pair of circumferentially spaced stop pins 202, and secured in the stud member 184 is a radial pin 204 which is movable between and engageable with the stop pins 202 for indexing the stud member 184 in either of its aforesaid two positions. The standard 148 also carries deflector arm 206 which may be selectively disposed either in a horizontal position as shown in FIGS. 2 and 3 during use of the fixture 14 or in a downwardly extending position during shipment or storage of the fixture 14.

When alignment of an optical scanner assembly 12 is desired, the assembly 12 is mounted in position on the fixture 14 by means of indexing pins and screws (not shown) extending between the base 146 of the fixture and the bottom of the main frame 32 of the assembly. The preamplifier 112 is then connected by lines 208 to separate electrical circuitry 210 (shown schematically in FIG. 6) which includes a micrometer 212. An optical scanner and printer unit 42 is next moved to a position adjacent the standard 148, and the index pin 66 (FIG. 2) of the assembly 12 is pushed into engagement with the drive pulley assembly 36. After the unit 42 has been locked in position by the index pin 66, the light source 168 is adjusted vertically and horizontally, as required, to effect adjustment thereof with the optical scanner 78 on the optimum optical center for maximum output of the scanner 78. Such optimum optical center is reached when the meter 212 indicates maximum current flow. The light source 168 is adjusted vertically along the line A–A in FIG. 6 by appropriately turning the screw 176, and is adjusted horizontally along the line B–B in FIG. 6 by appropriately turning the screw 180. In conjunction with adjustment of the light source 168 to establish alignment of the scanner 78 on the optimum optical center, the diaphragm leaves 98 and 100 of the optical scanner 78 may be adjusted by appropriately turning the screws 106 and 108 to thereby shift the position of the diaphragm aperture.

After the first optical scanner 78 has been aligned as discussed above, the scanner assembly index pin 66 is disengaged from the drive pulley assembly 36, and the second and third optical scanner and printer units 42 are successively and individually indexed adjacent the standard 148 by selectively locking the drive pulley assembly 36 against rotation with the slidable index pin 66. While each of the second and third optical scanners 78 is in turn positioned at the common index location, the diaphragm leaves 98 and 100 thereof are adjusted by appropriately turning the screws 106 and 108 until the diaphragm aperture is properly aligned with the preadjusted reference light source 168 on the optimum optical center. Thereafter, in normal operation, the photocells 92 of all three scanners 78 will scan along the same horizontal line at an accurate phase relationship with respect to the scanning drive means.

While the optical scanners 78 are being successively and individually aligned on the optimum optical center, the printer contact means may also be adjusted. In this connection, as each scanner and printer unit 42 is indexed at the standard 148, the rotary stud member 184 is revolved to its first position shown in FIG. 10 with the stud flat 190 in juxtaposition with the contact element 136. The screws 138 and 142 associated with the contact strip 132 are then adjusted until the contact element 136 is positioned at the proper height in contact with the stud flat 190 and parallel to the plane of the latter. Next, the stud member 184 is revolved from the position shown in FIG. 10 to the position shown in FIG. 5 with the lower edge of the shim 196 in juxtaposition with the contact element 136, and the screws 138 and 142 are again adjusted as required to align the contact element 136 parallel to the lower edge of the shim 196. Such parallelism (within 0.0002 inch) is reached when the meter 212 indicates maximum current flow corresponding to minimum resistance. In normal operation, after all three printer contact elements 136 have been aligned, they will move at an accurate phase relationship with respect to the scanning drive means for accurate cooperation with the printer bar 128 when the assembly 12 is mounted in the transceiver 10.

From the foregoing description, it will be appreciated that, with the fixture 14 and through simple adjustments in conjunction with readings of the meter 212, the optical scanners 78 and the printer contact elements 136 may be conveniently and accurately aligned. To accommodate alternate alignment of the optical scanners 78 and the printer contact elements 136, suitable manual switch means (not shown) is utilized to connect the meter 212 and the associated electrical circuitry 210 with either the line 113 or the line 145. While the fixture 14 is in use, the deflector arm 206 serves to deflect or guide the ribbon tape 110 past the standard 148. If desired, vernier adjustment means may be substituted for the adjustment screws 176 and 180 in connection with adjustment of the light source unit 157. Upon completion of alignment of the scanner assembly 12, the preamplifier is disconnected from the electrical circuitry 210, and the assembly 12 is removed from the fixture 14 and mounted in the transceiver 10. The fixture 14 is adapted to be used for alignment of the scanner assembly 12 both on the production line before the assembly 12 is initially mounted within the transceiver 10 and in the field upon removal of the assembly 12 from the transceiver 10 when readjustments are required.

While there has been shown and described a preferred embodiment of the present invention, it will be understood by those skilled in the art that various rearrangements and modifications may be made therein without departing from the spirit and scope of the invention.

What we claim is:

1. For use with a facsimile scanner assembly having at least one horizontally disposed optical scanner with adjustable diaphragm aperture means, an adjustment fixture comprising a base supporting the facsimile scanner assembly, a standard at one side of said base adjacent to which the optical scanner may be indexed, and a horizontally disposed light source unit carried by said standard and serving as a reference relative to which the diaphragm aperture means of the optical scanner may be adjusted to align the same on the optimum optical center.

2. The adjustment fixture of claim 1 including means for vertically and horizontally adjusting the position of said light source unit relative to the indexed optical scanner whereby to effect in conjunction with adjustment of the diaphragm aperture means alignment of the optical scanner on the optimum optical center.

3. For use with a facsimile scanner assembly having at least one horizontally disposed optical scanner, an adjustment fixture comprising a base supporting the facsimile scanner assembly, a standard at one side of said base adjacent to which the optical scanner may be indexed, a horizontally disposed light source unit carried by said standard, and means for vertically and horizontally adjusting the position of said light source unit relative to the indexed optical scanner whereby to effect alignment between said light source unit and the optical scanner on the optimum optical center.

4. For use with a facsimile assembly having at least one adjustable generally horizontally extending printer contact strip with an elongated contact element, an adjustment fixture comprising a base supporting the facsimile assembly, a standard at one side of said base adjacent to which the contact strip may be indexed, a horizontally disposed stud member mounted in said standard, and said stud member having a longitudinal flat relative to which the contact element of the contact strip may be adjusted at proper height in contact with said flat parallel to the plane of the latter.

5. The adjustment fixture of claim 4 including a metal shim mounted lengthwise in said stud member parallel to said flat with an exposed edge relative to which the contact element of the contact strip may be adjusted in parallel relationship, and wherein said stud member is revolvably mounted in said standard whereby either said flat or said exposed shim edge may be rotated into juxtaposition with the contact element of the contact strip.

6. For use with a facsimile assembly having at least one adjustable generally horizontally extending printer contact strip with an elongated contact element, an adjustment fixture comprising a base supporting the facsimile assembly, a standard at one side of said base adjacent to which the contact strip may be indexed, a horizontally disposed stud member mounted in said standard, and a metal shim mounted lengthwise in said stud member with an exposed edge relative to which the contact element of the contact strip may be adjusted in parallel relationship.

7. For use with a facsimile scanner assembly having a plurality of combined optical scanner and printer contact units each comprised of an optical scanner with adjustable diaphragm aperture means and an adjustable generally horizontally extending printer contact strip with an elongated contact element, an adjustment fixture comprising a base supporting the facsimile scanner assembly, a standard at one side of said base adjacent to which the combined optical scanner and printer contact units may be individually indexed, a horizontally disposed light source unit carried by said standard, means for vertically and horizontally adjusting the position of said light source unit relative to the first indexed optical scanner whereby to effect alignment between said light source unit and the first optical scanner on the optimum optical center, and said light source unit serving as a reference relative to which the diaphragm aperture means of the optical scanners may be successively adjusted to align the same on the optimum optical center and in corresponding horizontal and vertical planes.

8. The adjustment fixture of claim 7 including a hollow casing secured to said standard and surrounding at least a portion of said light source unit, and wherein said adjusting means comprises a vertical adjustment screw and opposed spring means carried by said casing and contacting said light source unit, and a horizontal adjustment screw and opposed spring means carried by said casing and contacting said light source unit.

9. The adjustment fixture of claim 7 including a horizontally disposed stud member mounted in said standard, said stud member having a first longitudinal flat relative to which the contact element of the contact strip may be adjusted at proper height in contact with said flat parallel to the plane of the latter, and a metal shim mounted lengthwise in said stud member parallel to said flat with an exposed edge relative to which the contact element of the contact strip may be adjusted in parallel relationship, and said stud member being revolvable whereby either said flat or said exposed shim may be rotated into juxtaposition with the contact element of the contact strip.

10. The adjustment fixture of claim 9 wherein said stud member has a nose portion projecting radially from a second longitudinal flat normal to said first longitudinal flat, and said exposed shim edge is exposed at the outer end of said nose portion.